May 12, 1970     F. W. POWELL     3,512,000
RADIATION SENSITIVE EXPOSURE CONTROL UNIT
Original Filed Sept. 5, 1967
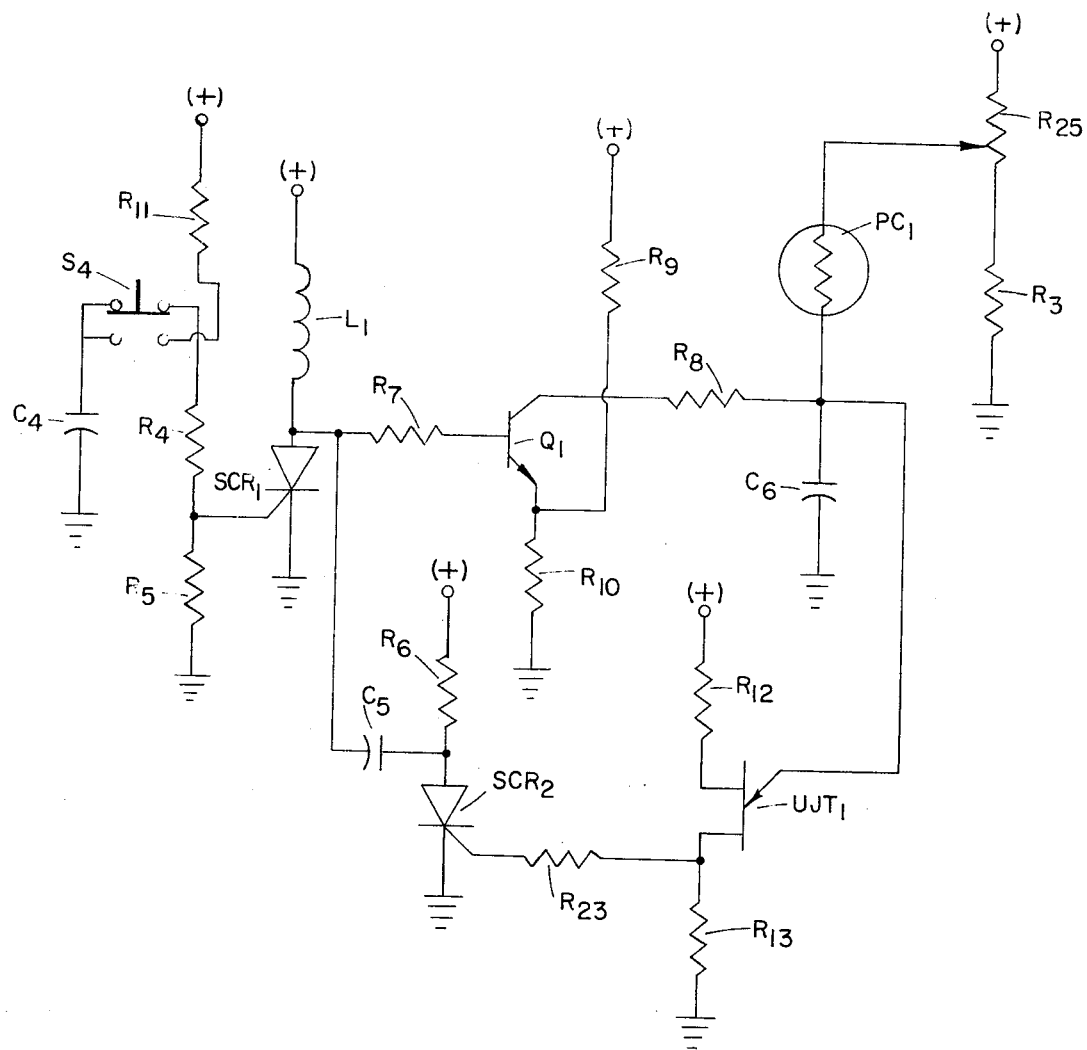
FREDERICK W. POWELL
INVENTOR.
BY Daniel E. Sragow
Robert W Hampton
ATTORNEYS

United States Patent Office 3,512,000
Patented May 12, 1970

3,512,000
RADIATION SENSITIVE EXPOSURE CONTROL UNIT
Frederick W. Powell, Rochester, N.Y., assignor to Eastman Kodak Company, Rochester, N.Y., a corporation of New Jersey
Continuation of application Ser. No. 665,569, Sept. 5, 1967. This application June 24, 1969, Ser. No. 839,790
Int. Cl. G03b 7/08; H01j 39/12
U.S. Cl. 250—214
3 Claims

ABSTRACT OF THE DISCLOSURE

An automatic exposure control is provided wherein light reflected from a subject to be photographed is directed onto a photoconductor which determines the rate of charge of a capacitor. When exposure is initiated, a solenoid opens the shutter. When the charge on the capacitor reaches a certain level, the shutter is closed. A novel arrangement of silicon conducting rectifiers and a unijunction transistor is utilized.

This application is a continuation of copending application Ser. No. 665,569 filed Sept. 5, 1967, now abandoned.

BACKGROUND OF THE INVENTION

In an apparatus which uses a very high contrast photographic medium, the exposure latitude is much less than in a system which uses a low contrast medium. This characteristic is inherent in the medium itself, i.e., the higher the contrast of the medium, the lower the exposure latitude. Typical apparatus which use a high contrast photographic medium is a copier for line original documents. Typical apparatus which uses a low contrast photographic medium is a camera which exposes a negative material to a scene. This invention is primarily concerned with an apparatus for copying line original documents and which therefore demands a rather precise control of the exposure since the exposure latitude of the photographic medium is very small.

SUMMARY OF THE INVENTION

This invention therefore relates to an exposure control which is very precise and is therefore suitable for applications where there is very little exposure latitude such as in an apparatus for copying line original documents. More particularly, the invention relates to an exposure control system which automatically regulates the exposure of an apparatus which copies line original documents and does it to a degree of precision which has heretofore been available only in equipment which is much more complicated and thus higher priced. The exposure control itself comprises a pair of silicon conducting rectifiers and a unijunction transistor.

BRIEF DESCRIPTION OF THE DRAWING

The single figure shown in the drawing shows a schematic diagram of an exposure control circuit according to the invention.

DESCRIPTION OF THE PREFERRED EMBODIMENT

The exposure is regulated by varying the time during which the shutter is open. The shutter is controlled by solenoid $L_1$. When the solenoid is energized, the shutter is opened. When the solenoid is de-energized, the shutter is closed.

The cycle is started by moving switch $S_4$ from its normal position shown in the drawing to a downward position to connect capacitor $C_4$ through resistor $R_{11}$ to a positive potential. This charges capacitor $C_4$ to approximately the value of the positive potential. When switch $S_4$ is returned to its rest position, capacitor $C_4$ discharges through resistors $R_4$ and $R_5$. This causes a potential rise on the gate electrode of silicon conducting rectifier $SCR_1$, thus turning it on to energize shutter solenoid $L_1$. At the same time, a negative pulse is coupled from ground through silicon conducting rectifier $SCR_1$ and through capacitor $C_5$ to the anode of silicon conducting rectifier $SCR_2$, thus turning it off, if it happens to be on from the previous cycle. Since the voltage on the anode of silicon conducting rectifier $SCR_1$ is now low, this low voltage is coupled through resistor $R_7$ to the base of transistor $Q_1$. This turns off transistor $Q_1$ due to the emiter voltage supplied by resistors $R_9$ and $R_{10}$. Resistor $R_9$ has a value on the order of $1.5\Omega$, whereas resistor $R_{10}$ has a value on the order of $100\Omega$.

During the time that transistor $Q_1$ is on, the voltage across capacitor $C_6$ is clamped at a low value. As soon as transistor $Q_1$ is turned off, however, capacitor $C_6$ is permitted to charge through resistor $R_{25}$, which acts as a voltage divider, and photoconductor $PC_1$. When the voltage across the capacitor reaches the firing potential of unijunction $UJT_1$, the unijunction transistor conducts, thus applying a positive potential through resistor $R_{12}$ which limits the current through the unijunction transistor $UJT_1$, and resistor $R_{23}$ to the gate electrode of silicon conducting rectifier $SCR_2$. When the gate electrode of silicon conducting rectifier $SCR_2$ is energized, it conducts thus lowering the potential on capacitor $C_5$, and coupling a negative pulse to the anode of silicon conducting rectifier $SCR_1$. In this way silicon conducting rectifier $SCR_1$ is turned off and the shutter solenoid is de-energized, terminating the exposure.

The invention has been described in detail with particular reference to preferred embodiments thereof, but it will be understood that variations and modifications can be effected within the spirit and scope of the invention as described hereinabove and as described in the appended claims.

I claim:
1. An exposure control comprising:
  (a) a photoelectric device adapted to be exposed to radiation from a subject,
  (b) a capacitance coupled to said photoelectric device,
  (c) first and second electrically controlled switches, each of said switches having a control terminal,
  (d) means coupled to the control terminal of said second electrically controlled switch and controlled by said capacitance for controlling said second electrically controlled switch,
  (e) electrical means coupled to the control terminal of said first electrically controlled switch for selectively energizing said first switch,
  (f) means for initiating and terminating an exposure interval, said means having energized and unenergized states and being controlled by said first electrically controlled switch,
  (g) means for causing said first electrically controlled switch to de-energize said initiating and terminating means when said second electrically controlled switch is energized,
  (h) means for holding the potential of said capacitance at a substantially fixed value when said initiating and terminating means is unenergized, and
  (i) means for changing the charge on said capacitance at a rate determined by the amount of radiation received by said photoelectric means when said initiating and terminating means is energized, whereby to determine the time duration of energization of said initiating and terminating means.

2. An exposure control, as defined in claim 1, wherein:
(a) said initiating and terminating means comprises a shutter control solenoid,
(b) said electrically controlled switches comprise controlled rectifiers, and
(c) said control means comprises a unijunction transistor.

3. An exposure control, as defined by claim 2, wherein said photoelectric device is a photoconductor.

References Cited

UNITED STATES PATENTS

| 3,343,043 | 9/1967 | Ito et al. | 250—206 X |
| 3,347,141 | 10/1967 | Nobusawa et al. | 95—10 |
| 3,349,678 | 10/1967 | Suzuki et al. | 95—10 |

WALTER STOLWEIN, Primary Examiner

U.S. Cl. X.R.

95—10; 250—206; 307—117